United States Patent
Kishimoto

(10) Patent No.: US 8,294,825 B2
(45) Date of Patent: Oct. 23, 2012

(54) IMAGE DISPLAY DEVICE AND IMAGE DISPLAY METHOD

(75) Inventor: Kazuyuki Kishimoto, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 724 days.

(21) Appl. No.: 12/311,279

(22) PCT Filed: Jul. 12, 2007

(86) PCT No.: PCT/JP2007/063930
§ 371 (c)(1),
(2), (4) Date: Mar. 25, 2009

(87) PCT Pub. No.: WO2008/059637
PCT Pub. Date: May 22, 2008

(65) Prior Publication Data
US 2009/0237572 A1 Sep. 24, 2009

(30) Foreign Application Priority Data

Nov. 16, 2006 (JP) .................... 2006-310614
Feb. 9, 2007 (JP) .................... 2007-031237

(51) Int. Cl.
*H04N 5/57* (2006.01)
*H04N 5/58* (2006.01)

(52) U.S. Cl. .............. 348/602; 348/687; 348/734

(58) Field of Classification Search .............. 348/734, 348/602, 603, 189–191, 687–689, 655–658
See application file for complete search history.

(56) References Cited

U.S. PATENT DOCUMENTS

| | | |
|---|---|---|
| 5,488,434 A | 1/1996 | Jung |
| 2005/0162619 A1 | 7/2005 | Hamaya |
| 2005/0264702 A1 | 12/2005 | Yoshii |
| 2006/0187195 A1* | 8/2006 | Chung ................... 345/156 |

FOREIGN PATENT DOCUMENTS

| | | |
|---|---|---|
| JP | 62-235883 | 10/1987 |
| JP | 11-327454 | 11/1999 |
| JP | 2004-128961 | 4/2004 |
| JP | 2006-072255 | 3/2006 |
| JP | 2006-254238 | 9/2006 |

OTHER PUBLICATIONS

European Office Action dated Nov. 2, 2009.

* cited by examiner

*Primary Examiner* — Michael Lee
(74) *Attorney, Agent, or Firm* — Harness, Dickey & Pierce, P.L.C.

(57) ABSTRACT

An image display device and an image display method are disclosed, each of which can adjust a display luminance so as to be sufficiently suitable for human adaptability to brightness. A display device main unit includes a display section and a luminance control section for adjusting a display luminance of an image displayed on the display section, and a remote controller includes: a signal transmission section for transmitting a signal; a light receiving section for measuring brightness of received light; and an operation input section for inputting a detail of control for the display device main unit, and the light receiving section measures brightness of light received from a direction of the display device main unit in association with an input operation performed with the operation input section, and the signal transmission section transmits information on the brightness to the display device main unit, and the luminance control section of the display device main unit adjusts the display luminance of the image, displayed on the display section, in accordance with the information on the brightness.

20 Claims, 10 Drawing Sheets

FRONT OF DISPLAY DEVICE MAIN UNIT (a)

RELATIONSHIP BETWEEN TELEVISION SCREEN AND
LIGHT RECEIVING RANGE (RANGE OF VISUAL FIELD)

(b)

(1): IN CASE OF ORDINARY VIEWING
DISTANCE AND ILLUMINATION
(2): IN CASE WHERE ILLUMINATION IS
DARKER
(3): IN CASE WHERE VIEWING DISTANCE
IS SHORTER

RELATIONSHIP BETWEEN "ALL" AND "Ed" UNDER VARIOUS CONDITIONS

IMAGE DISPLAY DEVICE AND IMAGE DISPLAY METHOD

TECHNICAL FIELD

The present invention relates to an image display device for displaying a video and to an image display method. Specifically, the present invention relates to a direct-view or projection type image display device and to an image display method each of which can dynamically adjust a luminance of a light source of the image display device in accordance with a photoenvironment seen by a user such as a viewer of the image display device.

BACKGROUND ART

A conventional image display device fails to adjust a display luminance so sufficiently that the adjustment is suitable for human visual properties, particularly, for human optic adaptability to brightness. Specifically, a conventional image display device fails to adjust a display luminance so that the adjustment corresponds to a photoenvironment of an image display device, i.e., the adjustment corresponds to brightness around the image display device.

This raises such problem that the user feels "too bright" or feels "black is not sufficiently deep (black loses its depth)" or does not feel any "radiance".

The user feels "too bright" when the user views a bright display in case where a periphery of the image display device is dark for example. This is because human is likely to feel brightness when a periphery thereof is dark. Further, the user feels "black loses its depth" when the user views a dark display in case where the periphery is dark.

On the other hand, the user does not feel "radiance" when the user views a bright display, for example, in case where the periphery of the image display device is bright. This is because human is unlikely to feel brightness when the periphery is bright.

Thus, in order to solve the foregoing problems, there has been proposed a technique in which brightness of an image to be displayed is adjusted in accordance with brightness of the periphery of the image display device.

For example, Patent Literature 1 describes a transmission type liquid crystal display element configured so that a luminance of an image to be displayed is adjusted in accordance with brightness of a periphery of the transmission type liquid crystal display element. FIG. 11 is a diagram illustrating essential portions of a conventional transmission type liquid crystal display element 100 described in Patent Literature 1. As illustrated in FIG. 11, the transmission type liquid crystal display element 100 includes a light receiving element 110, and the light receiving element 110 collects information on brightness of the periphery. Further, the thus collected information is amplified by a signal amplification circuit 120 as a signal and is transmitted to a display controller 130 and a power supply circuit 140.

The display controller 130 having received the signal changes a voltage added to a liquid crystal layer in accordance with content of the signal so as to change brightness of an image. In response to the signal, the power supply circuit 140 changes brightness of a light source 150 in accordance with the content of the signal. The display controller 130 and the power supply circuit 140 act to adjust a luminance of an image on a display screen according to brightness of the periphery.

CITATION LIST

Patent Literature 1: Japanese Patent Application Publication, Tokukaisho, No. 6.2-235883 A (Publication date: Oct. 16, 1987)

SUMMARY OF INVENTION

However, the conventional transmission type liquid crystal display device 100 cannot so sufficiently adjust a display luminance that the adjustment is suitable for human visual properties and thus fails to completely solve such a problem that "the display is too bright" and such a problem that "black loses its depth". This is described as follows.

In the conventional transmission type liquid crystal display device 100, the light receiving element 110 is provided on a surface in which a display screen of the transmission type liquid crystal display element 100 is positioned. Thus, the light receiving element 110 measures brightness in a direction of the user's backside but does not measure brightness of the periphery of the transmission type liquid crystal display element 100, i.e., brightness actually entering the user's eyes.

Further, what is important in adjusting a display luminance so sufficiently that the adjustment is suitable for human visual properties is brightness actually entering the user's eyes when the user is viewing the transmission type liquid crystal display element. This is because the human visual properties, particularly, the visual adaptability (level of the optic adaptability) to brightness depends on the brightness.

Thus, in the conventional transmission type liquid crystal display element 100, a display luminance is adjusted in accordance with information on brightness of the periphery, but the information is not based on brightness actually entering the user's eyes. As a result, the display luminance is not so sufficiently adjusted that the adjustment is suitable for human visual properties.

The present invention was made in view of the foregoing problems, and its object is to provide an image display device and an image display method each of which can adjust a display luminance so that the adjustment is sufficiently suitable for human adaptability to brightness.

In order to solve the foregoing problems, an image display device of the present invention comprises a remote controller and a display device main unit, wherein the display device main unit includes a display section and a luminance control section for adjusting a display luminance of a display image displayed on the display section, and the remote controller includes: a signal transmission section for transmitting a signal to the display device main unit; a light receiving section for measuring brightness of received light; and an operation input section for inputting an instruction regarding control for the display device main unit, and the light receiving section receives light from a direction of the display device main unit, and measures brightness of this light in association with the input operation performed with the operation input section, and the signal transmission section transmits, to the display device main unit, brightness information on the brightness of the light received from the direction of the display device main unit, said brightness being measured by the light receiving section, and the luminance control section of the display device main unit adjusts the display luminance of the display image on the display section, in accordance with the received brightness information.

Herein, the phrase "measures brightness of light received from a direction of the display device main unit in association with an input operation performed with the operation input section" means to measure, in response to the input operation performed with the operation input section, brightness at the same time as the input operation is performed with the operation input section or when a certain time period passes from the input operation.

With the foregoing configuration, the user can adjust a display luminance so that the adjustment is sufficiently suitable for human adaptability to brightness, only by performing the input operation with an ordinary remote controller for controlling the display device main unit, without any additional operations. This is described as follows.

The light receiving section of the present invention measures the brightness of the light, received from the direction of the display device main unit, in association with the input operation performed with the operation input section. This makes it possible to measure the brightness in the direction of the display device main unit, i.e., ambient brightness of the display device main unit. Further, the information on the measured brightness in the direction of the display device main unit is transmitted to the display device main unit via the signal transmission section provided on the remote controller and the signal receiving section provided on the display device main unit. Subsequently, the luminance control section adjusts the display luminance of the image in accordance with the information of the brightness in the direction of the display device main unit which information is transmitted to the display device main unit.

Thus, it is possible to adjust the display luminance in accordance with the information on the brightness in the direction of the display device main unit, i.e., the information on the brightness actually entering the user's eyes, so that a video can be displayed according to human visual properties. This makes it possible to solve the problems such as "too bright" and "black loses its depth" raised by the conventional image display device.

Hence, it is possible to provide the image display device which can adjust a display luminance so that the adjustment is sufficiently suitable for human adaptability to brightness.

Further, the image display device of the present invention is configured so that: the display device main unit includes a light source for backlighting the display section, and the luminance control section includes a light source output control section for controlling an output of the light source, and the light source output control section adjusts the display luminance of the display image on the display section by controlling the output of the light source in accordance with the brightness information received by the display device main unit.

With the foregoing configuration, the display luminance of the image can be adjusted by controlling the output of the light source, so that the display luminance can be easily adjusted.

Further, the image display device of the present invention is configured so that: the luminance control section includes an output value calculation section for calculating an output value of the light source, and the output value calculation section calculates the output value in accordance with the brightness information received by the display device main unit, and the light source output control section controls the output of the light source in accordance with the calculated output value.

With the foregoing configuration, there is provided the output value calculation section for calculating a value indicative of the output of the light source. Thus, in controlling the output of the light source, it is possible to perform any calculation process with respect to the information on the brightness in the direction of the display device main unit which brightness is measured by the light receiving section.

For example, it is possible to perform a functional process suitable for human adaptability to brightness. This makes it possible to adjust the display luminance so that the adjustment is more suitable for human adaptability to brightness.

Further, the image display device of the present invention is configured so that the output value calculated by the output value calculation section is a value indicative of a ratio of the output to a maximum output of the light source.

With the foregoing configuration, the output value of the light source which output value is calculated by the output value calculation section is a value indicative of a ratio of the output to a maximum output of the light source. Thus, in controlling the output of the light source, easier control can be achieved.

Further, the image display device of the present invention is configured so that the output value calculation section calculates the output value of the light source by use of the brightness information in accordance with a relationship between the brightness of the light and the output value of the light source which relationship has been beforehand set so that the output value of the light source is larger as the brightness of the light received from the direction of the display device main unit is higher, said brightness information being received by the display device main unit.

With the foregoing configuration, it is possible to more surely solve the problems such as "too bright", "black loses its depth", and "radiance cannot be felt". This makes it possible to more surely adjust a display luminance so that the adjustment is suitable for human adaptability to brightness. This is described as follows.

For example, the user feels "too bright" when the user views a bright display in case where the periphery of the image display device main unit is dark. This is because the human is likely to feel brightness in case where the periphery is dark.

Further, the user feels "black loses its depth" when the user views a dark display in case where the periphery is dark.

With the foregoing configuration, the light source output control section decreases a value of the output when the brightness in the direction of the display device main unit is low. Thus, the display luminance drops, which makes it possible to suppress the user from feeling "too bright" or feeling "black loses its depth".

Further, the user does not feel "radiance" when the user views a bright display in case where the periphery of the image display device is bright. This is because the human is less likely to feel brightness when the periphery is bright.

With the foregoing configuration, the light source control section increases a value of the output of the light source when the brightness in the direction of the display device main unit is high. Thus, the display luminance is high, which allows the user to be more likely to feel the "radiance".

As a result, it is possible to more surely adjust a display luminance so that the adjustment is suitable for human adaptability to brightness.

Further, it is preferable to configure the image display device of the present invention so that the output value calculation section is provided so that a user is capable of setting a level of the display luminance relative to the relationship between the brightness of the light and the output value of the light source.

With the foregoing arrangement, it is possible to adjust a display luminance so as to be suitable for preference of each user. This makes it possible to adjust a display luminance so that the adjustment is more suitable for human adaptability to brightness.

Note that, the level of the display luminance is a level of a video display luminance relative to the brightness measured by the light receiving section. In other words, the level of the display luminance is a level of a display luminance of a certain display relative to a peripheral condition of the display device main unit.

Further, it is preferable to configure the image display device of the present invention so that the signal transmission section and the light receiving section are provided on the remote controller so as to be positioned on a same surface of the remote controller.

With the foregoing configuration, a direction in which the signal transmission section transmits a signal and a direction in which the light receiving section measures brightness can be easily and surely made identical to each other. This makes it possible to more surely adjust a display luminance so that the adjustment is sufficiently suitable for human adaptability to brightness. This is described as follows.

When the user performs the input operation with the input operation section of the remote controller to control the display device main unit, the user aims the signal transmission section of the remote controller at the display device main unit. Further, the remote controller is configured so that the signal transmission section and the light receiving section are positioned on the same surface of the remote controller. Thus, the direction in which the signal transmission section transmits a signal and the direction in which the light receiving section measures brightness can be easily and surely made identical to each other. As a result, a direction of the light receiving section of the remote controller can be easily and surely made identical to the direction of the display device main unit when the user is to control the display device main unit by use of the remote controller.

Hence, it is possible to more surely adjust a display luminance in accordance with brightness in the direction of the display device main unit, i.e., in accordance with ambient brightness of the display device main unit. This makes it possible to more surely adjust a display luminance so that the adjustment is sufficiently suitable for human adaptability to brightness.

Further, it is preferable to configure the image display device of the present invention so that a light receiving range of the light receiving section covers at least a range of an effective visual field of human eyes. Herein, the phrase "covers at least a range of an effective visual field of human eyes" means to cover not only the effective visual field but also, for example, an induced visual field which is a peripheral region of the effective visual field.

With the foregoing configuration, it is possible to adjust a display luminance in accordance a range of light entering the human eyes. This makes it possible to adjust a display luminance so that the adjustment is more suitable for human adaptability to brightness.

Further, it is preferable to configure the image display device of the present invention so that: the remote controller includes a light receiving control section for determining an input-to-measurement time between the input operation and start of measurement of brightness which measurement is performed by the light receiving section, and the light receiving control section determines the input-to-measurement time in accordance with a time between the input operation and response of the display device main unit which response is based on the instruction regarding the control for the display device main unit.

The time between the input operation actually performed with the operation input section and a display of a video based on the detail of the control for the display device main unit varies depending on a type of the operation input section with which the input operation is performed. Thus, if brightness is measured at the same timing as the control regardless of the detail of the control, brightness before incorporation of the detail of the control may be measured. In this case, it is impossible to adjust a display luminance so that the adjustment is suitable for an actual viewing condition.

With the foregoing configuration, the time between the input operation performed with the operation input section and the measurement of the brightness is changed in accordance with the detail of the control, and the brightness is measured with an operation of the display device main unit being based on the detail of the control. This makes it possible to adjust a display luminance so that the adjustment is more suitable for an actual viewing condition.

Further, it is preferable to configure the image display device of the present invention so that the operation input section of the remote controller includes a special operation button for instructing the light receiving section to measure the brightness.

Even if a display luminance is adjusted with control for the display device main unit, a video luminance of a broadcast program may subsequently change or ambient brightness of the display device main unit may subsequently change, so that the previously performed adjustment of the display luminance may be inappropriate.

With the foregoing configuration, the operation input section of the remote controller includes a special operation button for instructing the light receiving section to start measurement of the brightness, so that the display luminance can be easily adjusted again. This makes it possible to easily adjust a display luminance so that the adjustment is suitable for any displayed scene, i.e., content of a displayed image, and suitable for an ambient condition of the display device main unit.

Further, it is preferable to configure the image display device of the present invention so that: the display section includes a display screen for displaying the display image thereon, and the display device main unit includes a signal receiving section, positioned in a center of an upper side of a frame surrounding the display screen, for receiving a signal transmitted from the remote controller.

With the foregoing configuration, it is possible to more effectively obtain information on ambient brightness, and it is possible to adjust a display luminance so that the adjustment is more suitable for an actual viewing condition. This is described as follows.

Generally, ambient brightness of the display device main unit is likely to be influenced by illumination above the display device main unit. The human eyes are likely to be adapted to more intense light in the visual field. As upper bright light can be measured, it is possible to adjust a display luminance so that the adjustment is suitable for an actual adaptability level. Therefore, in adjusting a display luminance so that the adjustment is more suitable for human adaptability to brightness, it is preferable to adjust a display luminance in accordance with brightness in the vicinity of an upper region of the display screen.

Generally, when the user performs the input operation with the remote controller, the user aims the signal transmission section of the remote controller at the signal receiving section of the display device main unit.

In the image display device of the present invention, the signal receiving section is provided on the center of the upper side of the frame surrounding the display screen, so that it is possible to easily and surely measure brightness in the vicinity of the upper region of the display screen in measuring the brightness in association with the user's input operation performed with the remote controller. This makes it possible to adjust a display luminance so that the adjustment is more suitable for human adaptability to brightness.

In order to solve the foregoing problems, an image display method of the present invention, in which a display luminance of a display image displayed on a display device main unit of an image display device including a remote controller and the display device main unit is adjusted by controlling an output of a light source provided on the display device main unit, and said method comprises: a first step in which a light receiving section provided on the remote controller measures brightness in a direction of the display device main unit; a second step in which the remote controller transmits brightness information on the brightness measured in the first step to the display device main unit and the display device main unit receives the brightness information; a third step in which an output value of a light source is calculated in accordance with the brightness information received in the second step; and a fourth step in which the display luminance of the display image displayed on a display section is adjusted in accordance with the output value of the light source which output value is calculated in the third step.

With the foregoing configuration, it is possible to adjust a display luminance of an image, displayed on the display section, in accordance with the information on the brightness in the direction of the display device main unit which brightness is measured by the light receiving section provided on the remote controller.

Thus, the present invention can provide an image display method which can adjust a display luminance so that the adjustment is sufficiently suitable for human adaptability to brightness.

In order to solve the foregoing problems, an image display device of the present invention comprises a remote controller and a display device main unit, wherein: the display device main unit includes: a display section; a luminance control section for adjusting a display luminance of a display image displayed on the display section; and an average luminance level calculation section for calculating an average luminance level of an image signal inputted to the display section, and the remote controller includes: a signal transmission section for transmitting a signal to the display device main unit; a light receiving section for measuring brightness of received light; and an operation input section for inputting an instruction regarding control for the display device main unit, and the light receiving section receives light from a direction of the display device main unit, and measures brightness of this light in association with the input operation performed with the operation input section, and the signal transmission section transmits, to the display device main unit, brightness information on the brightness of the light received from the direction of the display device main unit, said brightness being measured by the light receiving section, and in accordance with (a) the brightness information received by the display device main unit and (b) the average luminance level of the image signal inputted to the display section at the same time as the brightness is measured, the luminance control section derives an expression indicative of a relationship between (i) an average luminance level of an image signal inputted to the display section when or after the brightness is measured and (ii) brightness of light received from a direction of the display device main unit at the same time as this image signal is inputted, and the luminance control section adjusts the display luminance of the display image on the display section, in accordance with calculated brightness of the light received from the direction of the display device main unit, said calculated brightness being calculated, on the basis of the expression, in accordance with the average luminance level of the image signal inputted to the display section when or after the brightness is measured.

Generally, when viewing the image display device, brightness actually entering the user's eyes is not constant but varies. For example, a main component of brightness entering the user's eyes, i.e., brightness of an image displayed on the image display device changes due to a great change of television video brightness or a similar factor. Further, other component of brightness entering the user's eyes, i.e., ambient brightness of the image display device may change, for example, with a change of brightness of illumination in the vicinity of the image display device.

With the foregoing configuration, a display luminance is adjusted in accordance with a change of brightness entering the user's eyes, thereby adjusting the display luminance so that the adjustment is more suitable for human adaptability to brightness. This is described as follows.

That is, with the foregoing configuration, the average luminance level calculation section for calculating an average luminance level of the image signal is provided, and in accordance with the average luminance level calculated by the average luminance calculation section and the brightness of the light received by the light receiving section from the direction of the display device main unit, the luminance control section derives an expression indicative of a relationship between (i) an average luminance level of an image signal inputted to the display section and (ii) brightness of light received from the direction of the display device main unit at the same time as this image signal is inputted.

Thus, after the expression is derived, calculation is performed, in accordance with the average luminance level calculated by the average luminance level calculation section, on the basis of the expression, without causing the light receiving section of the remote controller to actually measure brightness of light from the direction of the display device main unit. This makes it possible to estimate the brightness of the light received from the direction of the display device main unit.

While, brightness entering the user's eyes mainly influences human adaptability to brightness (optic adaptability level), and this brightness is substantially equal to the brightness of the light received from the direction of the display device main unit.

Thus, with the foregoing configuration, the brightness which mainly influences the adaptability level, i.e., the brightness of the light received from the direction of the display device main unit can be estimated without actual measurement.

With the foregoing configuration, a display luminance of an image displayed on the display section is adjusted in accordance with the calculated brightness of the light received from the direction of the display device main unit.

As described above, with the foregoing configuration, even if brightness entering the user's eyes changes when viewing the image display device, a value of the brightness can be estimated in accordance with an average luminance level calculated by the average luminance level calculation section in each case. Thus, it is possible to easily adjust an image luminance in accordance with the change without any user's operation for measuring brightness of light received from the direction of the display device main unit.

Thus, by adjusting a display luminance in accordance with the change of the brightness entering the user's eyes, it is possible to adjust a display luminance so that the adjustment is more suitable for human adaptability to brightness.

Further, the image display device of the present invention is configured so that the luminance control section of the display device main unit derives the expression in accordance with a plurality of combinations each including (I) the information on the brightness which information is received by the display device main unit and (II) the average luminance level of the image signal inputted to the display section at the same time as the brightness is measured.

With the foregoing configuration, in deriving the expression indicative of the relationship between the average luminance level of the inputted image signal and the brightness of the light received from the direction of the display device main unit at the same time as the image signal is inputted, the expression is derived in accordance with the plurality of combinations each including the brightness of the light from the direction of the display device main unit which brightness is measured by the light receiving section and the average luminance level of the image signal inputted to the display section at the same time as the brightness is measured. This makes it possible to easily derive the expression with high accuracy.

Further, the image display device of the present invention is configured so that: the average luminance level calculation section calculates, in real time, the average luminance level of the inputted image signal, and the luminance control section of the display device main unit automatically adjusts, in real time, the display luminance of the display image on the display section, in accordance with calculated brightness of the light received from the direction of the display device main unit, said calculated brightness being calculated, on the basis of the expression, in accordance with the average luminance level of the image signal which average luminance level is calculated in real time.

With the foregoing configuration, a display luminance of an image is automatically adjusted in real time in accordance with the average luminance level calculated in real time. This makes it possible to realize optimal luminance control in accordance with various videos and viewing conditions without requiring the user to perform any special operation.

In order to solve the foregoing problems, an image display method of the present invention, in which a display luminance of a display image displayed on a display device main unit of an image display device including a remote controller and the display device main unit is adjusted by controlling an output of a light source provided on the display device main unit, and said method comprises: a first step in which a light receiving section provided on the remote controller measures brightness in a direction of the display device main unit; a second step in which an average luminance level calculation section provided on the display device main unit calculates an average luminance level of an image signal inputted to the display device main unit at the same time as the brightness is measured in the first step; a third step in which the remote controller transmits brightness information on the brightness measured in the first step to the display device main unit and the display device main unit receives the brightness information; a fourth step in which, in accordance with (a) the brightness information received by the display device main unit and (b) the average luminance level of the image signal inputted to the display section at the same time as the brightness is measured, a luminance control section provided on the display device main unit derives an expression indicative of a relationship between (i) an average luminance level of an image signal inputted to the display section when or after the brightness is measured and (ii) brightness of light received from a direction of the display device main unit at the same time as this image signal is inputted; and a fifth step in which the average luminance level calculation section adjusts, in real time, the display luminance of the display image on a display section, in accordance with calculated brightness of the light received from the direction of the display device main unit, said calculated brightness being calculated, on the basis of the expression, in accordance with the average luminance level of the image signal which average luminance level is calculated in real time, said image signal being inputted to the display section when or after the brightness is measured.

With the foregoing configuration, there is derived the expression indicative of the relationship between (i) the average luminance level of an image signal and (ii) the brightness of the light received from the direction of the display device main unit at the same time as this image signal is inputted. Further, the average luminance level calculation section calculates the brightness of the light received from the direction of the display device main unit, in accordance with the average luminance level calculated in real time, on the basis of the expression. Further, a display luminance of an image displayed on the display section is adjusted in real time in accordance with the calculated brightness.

In this manner, even if brightness entering the user's eyes in viewing the image display device variously changes, a value of the brightness can be estimated in accordance with the average luminance level calculated by the average luminance level calculation section. This makes it possible to easily adjust a luminance of an image in accordance with the change without the user's operation for measuring brightness of light received from the direction of the display device main unit.

Thus, the aforementioned method can adjust a display luminance in accordance with a change of brightness entering the user's eyes, thereby adjusting the display luminance so that the adjustment is more suitable for human adaptability to brightness.

REFERENCE SIGNS LIST

Figure 1:
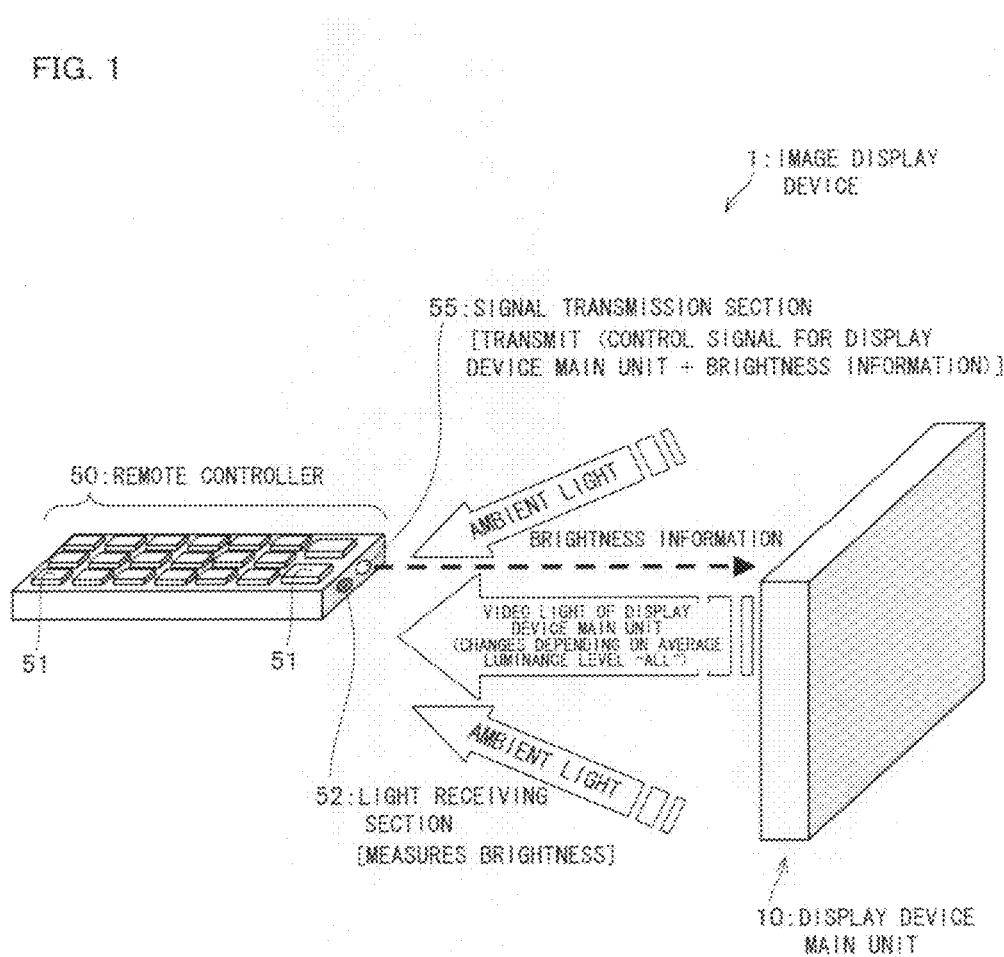
FIG. 1 is a perspective view illustrating an embodiment of an image display device of the present invention.

1 Image display device
10 Display device main unit
11 Display section
16 Display screen
17 Frame
20 Signal receiving section
22 Average luminance level calculation section
24 Luminance control section
25 Output value calculation section
26 Light source output control section
30 Light source
50 Remote controller
51 Operation input section
52 Light receiving section
53 Light reception control section
55 Signal transmission section
100 Transmission type liquid crystal display element
110 Light receiving element
120 Signal amplification circuit
130 Display controller
140 Power supply circuit
150 Light source

DESCRIPTION OF EMBODIMENTS

Embodiment 1

Embodiment 1 of the present invention is described below with reference to FIG. 1 to FIG. 7.
(Configuration of Image Display Device)
FIG. 1 is a perspective view illustrating Embodiment 1 of an image display device 1 of the present invention. As illustrated in FIG. 1, the image display device 1 of the present embodiment includes: a display device main unit 10 for displaying a video, e.g., a liquid crystal display device or the like; and a remote controller 50 for remote-controlling the display device main unit 10.
(Configuration of Remote Controller)
As illustrated in FIG. 1, the remote controller 50 includes: operation input sections 51 which are operation buttons, operation dials, and the like; a light receiving section 52 for measuring brightness of received light; a light reception control section (not shown) for instructing the light receiving section 52 to start measurement of brightness; and a signal transmission section 55 for transmitting a signal to the display device main unit 10. Further, the signal transmission section 55 transmits (i) a control signal for the display device main unit 10 which control signal is generated in response to an input operation performed with the operation input sections 51 and (ii) information on the brightness measured by the light receiving section 52, to the display device main unit 10.

The light receiving section 52 and the signal transmission section 55 are provided on a face on the rectangular remote controller 50, so that a light receiving direction of the light receiving section 52 and a transmitting direction of the signal transmission section 55 are substantially identical to each other. As a result, the light receiving section 52 can measure brightness of light of a video displayed on the display device main unit 10 and brightness of ambient light from surroundings of the display device main unit 10, in other words, brightness of light received from a direction of the display device main unit 10, when the signal transmission section 55 of the remote controller 50 is aimed at the display device main unit 10 to transmit a control signal for display device to the display device main unit 10.

Further, it is preferable that a light receiving range of the light receiving section 52 is set to be identical to a range of a human visual field. Specifically, it is preferable that the light receiving range is set to be identical to a range obtained by combining an effective visual field with an induced visual field which is a peripheral visual field of the effective visual field.

Specifically, the light receiving range is set so as to be capable of receiving light whose right angle is 50°, left angle is 50°, upward angle is 35°, and downward angle is 50°. Note that, the light receiving range can be set by adjusting a lens, an aperture, and the like of the light receiving section 52 for example.
(Configuration of Display Device Main Unit)
Next, the display device main unit 10 of the present embodiment is described below with reference to FIG. 2 and FIG. 3.

Figure 2:
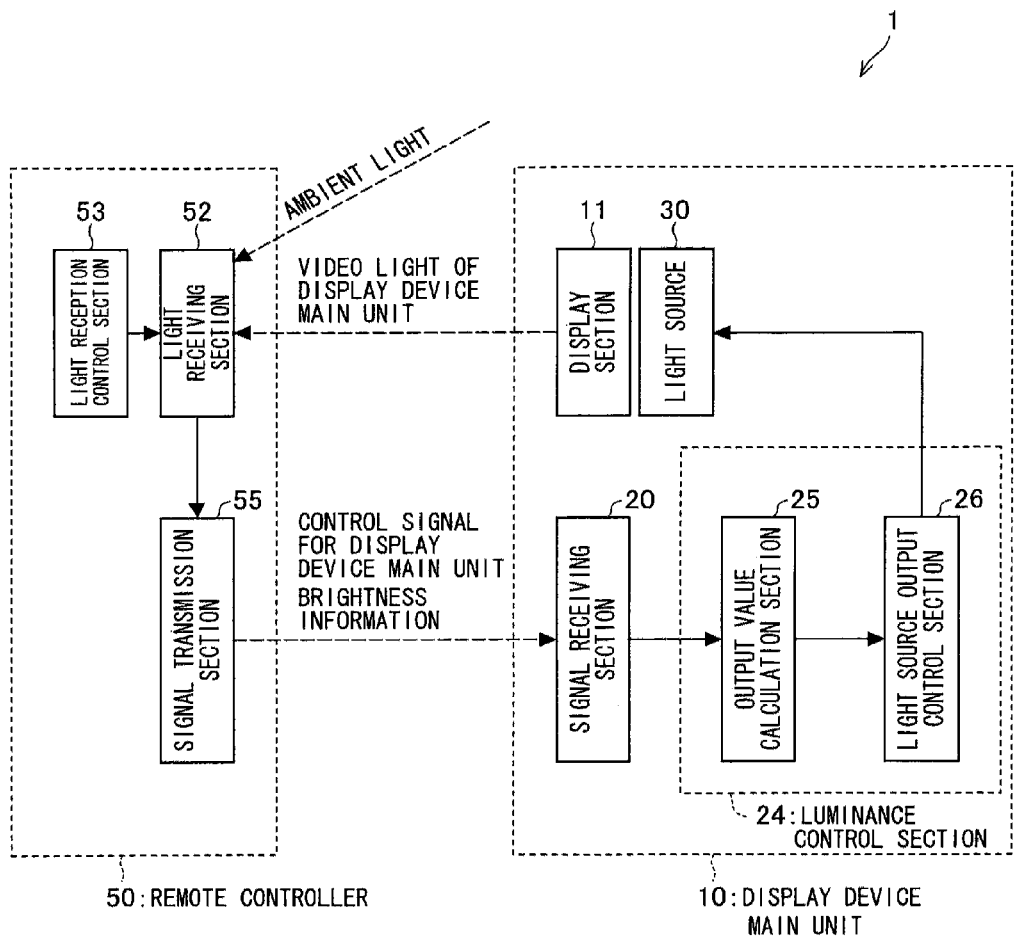
FIG. 2 is a block diagram illustrating an embodiment of an image display device of the present invention.

FIG. 2 is a block diagram illustrating an embodiment of the image display device 1 of the present invention. As illustrated in FIG. 2, the display device main unit 10 of the present embodiment includes: a display section 11 for displaying a video; and a light source 30 such as a backlight or the like. In the present embodiment, the display section 11 is a non-self-luminous display element, e.g., a liquid crystal display element, and the non-self-luminous display element is illuminated by the light source 30 such as the backlight or the like, thereby displaying an image.

Further, the display device main unit 10 includes: a signal receiving section 20 for receiving a signal transmitted from the signal transmission section 55 of the remote controller 50; and a luminance control section 24 for adjusting a display luminance of an image displayed on the display section 11 in accordance with the signal.

Further, the luminance control section 24 includes: an output value calculation section 25 for calculating an output value of the light source (light source output value), e.g., a value indicative of a ratio of the output to a maximum output of the light source for example; and a light source output control section 26 for controlling the output of the light source 30 in accordance with the light source output value calculated by the output value calculation section 25.

Figure 3:
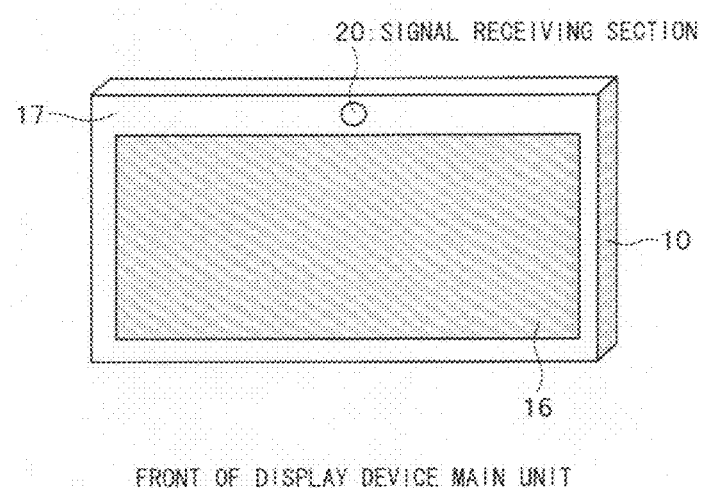
FIG. 3 is a perspective view illustrating an embodiment of a display device main unit of the present invention.

Further, FIG. 3 is an oblique view illustrating an embodiment of the display device main unit 10 of the present invention. As illustrated in FIG. 3, a display screen 16 for displaying a video is provided on the display section 11, and the display screen 16 is exposed at a front face of the display device main unit 10, i.e., at a face opposite to the user. Further, the signal receiving section 20 is provided on a frame 17 of the display device main unit 10 so as to be positioned on a face having the display screen 16 thereon.

It is preferable that the signal receiving section 20 of the display device main unit 10 is provided on the frame 17, surrounding the display screen 16, so as to be positioned in a center of an upper side over the display screen 16. The human eye is more likely to be adapted to more intense light, so that it is possible to perform luminance adjustment closer to an actual adaptability level when bright light in the upper side can be more sufficiently measured.
(Action)
Next, how the image display device 1 of the present embodiment acts is described below. In the image display device 1 of the present embodiment, information on brightness measured by the light receiving section 52 of the remote controller 50 is transmitted from the signal transmission section 55 to the display device main unit 10 via the signal receiving section 20. Further, the display device main unit 10 controls brightness of the light source in accordance with the received information so as to display an image in a manner suitable for ambient brightness of the display device main unit 10. This is described below.

First, the user pushes any button of the operation input sections 51 of the remote controller 50 or performs a similar operation so as to carry out an input operation with the operation input sections 51. In response to this input operation, the signal transmission section 55 of the remote controller 50 transmits a display device main unit control signal which corresponds to the operation input sections 51 subjected to the user's input operation and which allows for control of the display device main unit 10.

In addition to this, the remote controller 50 of the present embodiment is configured so that the light receiving section 52 of the remote controller 50 measures brightness in response to the input operation performed with any buttons of the operation input sections 51. In this case, the light receiving section 52 of the present embodiment and the signal transmission section 55 are provided on a face so that the light receiving section 52 of the present embodiment and the signal transmission section 55 face in the same direction. Further, when the user is to control the display device main unit 10 by use of the remote controller 50, the signal transmission section 55 of the remote controller 50 faces in the direction of the display device main unit 10. Thus, as in the signal transmission section 55, also the light receiving section 52 faces in the direction of the display device main unit 10. In this manner, the light receiving section 52 measures brightness in the direction of the display device main unit 10, i.e., ambient brightness of the display device main unit 10.

Further, in the remote controller 50 of the present embodiment, the signal transmission section 55 transmits, as in the display device main unit control signal, brightness information corresponding to the ambient brightness of the display device main unit 10 which has been measured by the light receiving section 52 of the remote controller 50 after transmission of the display device control signal.

Further, the display device main unit control signal and the brightness information which have been transmitted from the signal transmission section 55 are received by the signal receiving section 20, and a light source output value for the light source 30 is calculated in accordance with the brightness information received by the output value calculation section 25 of the display device main unit 10.

Next, the light source output control section 26 controls the output of the light source 30 in accordance with the thus calculated light source output value, thereby performing display luminance adjustment sufficiently suitable for the human adaptability to brightness.

Note that, it is preferable that, when the light receiving section 52 measures brightness, a time between the input operation performed with the operation input section 51 and the brightness measurement of the light receiving section 52 (timing at which brightness is sensed) is changed in accordance with a type of the operation input section 51 of the remote controller 50 with which the user performs the input operation.

This is because a time between the input operation performed with the operation input section 51 and display of a video based on content of control for the display device main unit 10 varies depending on a type of the operation input section 51 subjected to the input operation. For example, there are three types of control with respect to the display device main unit 10. In this case, a time between the input operation performed with the operation input section 51 and display of a video based on content of control with respect to the display device main unit 10 is generally as follows: (Type A)<(Type B)<(Type C)

(Type A) Control which does not switch a broadcast program, e.g., control which changes a sound volume or switches a display setting.

(Type B) Control which turns on the power or switches a channel.

(Type C) Control which switches a received broadcast wave (ground wave digital broadcast, BS (Broadcasting Satellite) broadcast, CS (Communication Satellite) broadcast, the like).

Further, in order to perform display luminance adjustment sufficiently suitable for the visual properties, it is preferable to measure brightness under such condition that a video based on content of the control with respect to the display device main unit 10 is displayed on the display screen 16 of the display device main unit 10. This is based on the following reason. Before and after incorporation of content of the control, ambient brightness of the display device main unit 10 may change, so that it is necessary to perform display luminance adjustment in accordance with actual ambient brightness of the display device main unit 10 at the time when the user views the video, thereby appropriately performing display luminance adjustment.

(Flow for Adjusting Display Luminance)

Figure 4:
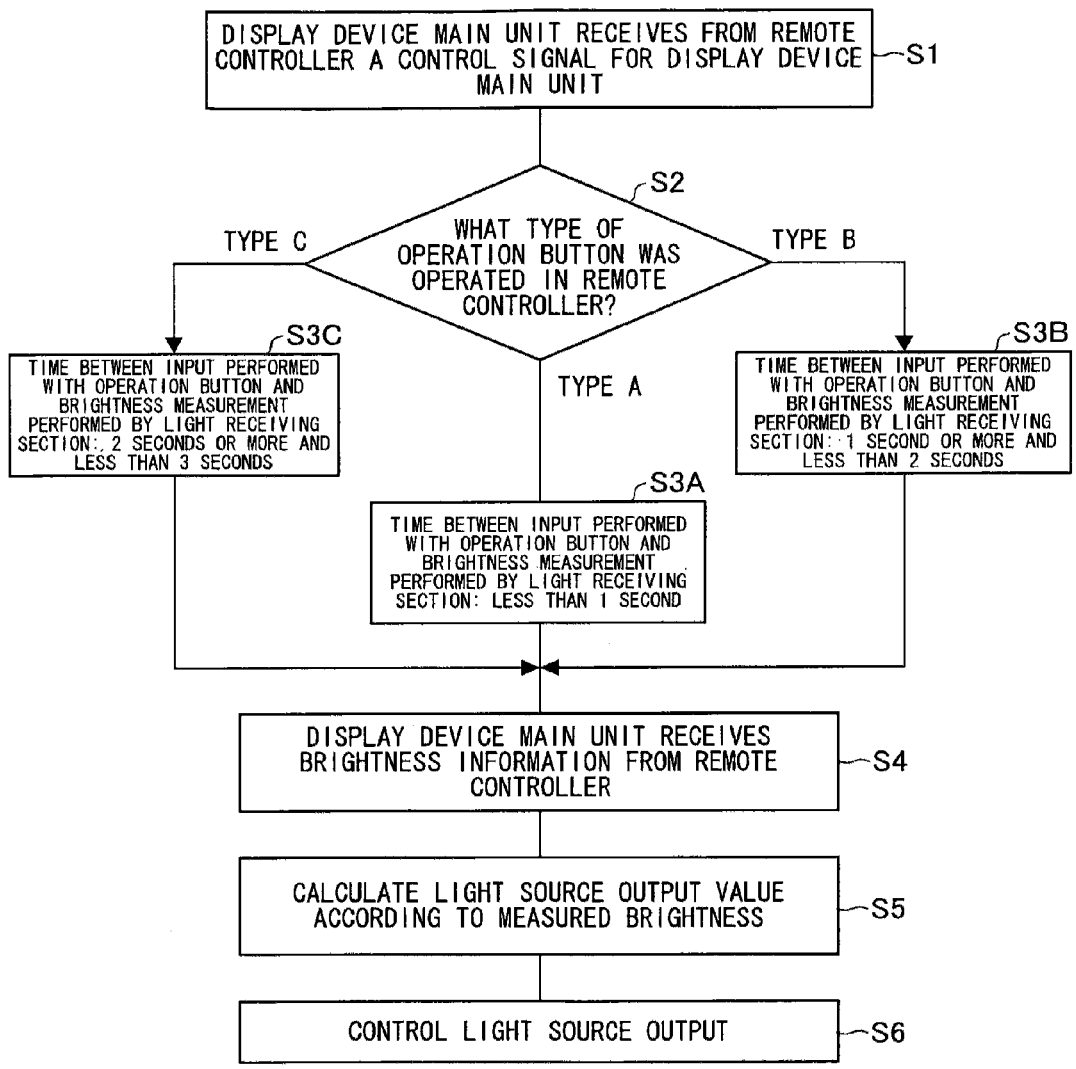
FIG. 4 is a flowchart illustrating a flow for adjusting a display luminance in the present invention.

A flow for adjusting a display luminance is described below with reference to FIG. 4. FIG. 4 is a flowchart illustrating a flow for adjusting a display luminance in the present invention.

(S1)

When the user pushes the operation input section 51 of the remote controller 50 or performs a similar operation, a display device main unit control signal is transmitted from the remote controller 50 and is received by the signal receiving section 20 of the display device main unit 10 (S1 of FIG. 4).

(S2)

Next, the light receiving section 52 of the remote controller 50 measures brightness in response to a measurement start instruction given from the light reception control section 53. The measurement timing, in other words, a time between the input operation performed with the operation input section 51 and the measurement of the brightness is determined depending on a type of the operation input section 51 subjected to the input operation (S2 of FIG. 4). That is, the light reception control section 53 determines a timing for giving an instruction to start the measurement in accordance with a type of the operation input section 51 subjected to the input operation.

(S3A)

Specifically, in case where the control with respect to the display device main unit 10 is the control which does not switch a broadcast program, e.g., which changes a sound volume or switches a display setting (in case of the aforementioned type A), a time between the input operation performed with the operation input section 51 and the measurement of the brightness is set to be less than 1 second (S3A of FIG. 4).

(S3B)

Further, in case where the control with respect to the display device main unit 10 is the control which turns on the power or switches a channel (in case of the aforementioned type B), a time between the input operation performed with the operation input section 51 and the measurement of the brightness is set to be 1 second or more and less than 0.2 seconds (S3B of FIG. 4).

(S3C)

Further, in case where the control with respect to the display device main unit 10 is the control which switches a received broadcast wave (ground wave digital broadcast, BS broadcast, CS broadcast, or the like) (in case of the aforementioned type C), a time between the input operation performed with the operation input section 51 and the measurement of the brightness is set to be 2 seconds or more and less than 3 seconds (S3C of FIG. 4).

As described above, in the image display device 1 of the present embodiment, the time between the input operation and the measurement of the brightness is set as three types: less than 1 second; 1 second or more and less than 2 seconds; and 2 seconds or more and less than 3 seconds.

(S4)

Further, the brightness information based on the brightness measured in the predetermined time is transmitted from the remote controller 50 and is received by the signal receiving section 20 of the display device main unit 10 (S4 of FIG. 4).

(S5)

Next, on the basis of the received brightness information, a light source output value for the light source 30 is calculated by the output value calculation section 25 of the luminance control section 24 (S5 of FIG. 4).

A specific example of the calculation of the light source output value for the light source 30 is described below. In the following example, the calculation equation is defined on the basis of such condition that the human eye is adapted to light within a range of the visual field and feels the brightness differently in viewing a single object depending on a degree of the brightness (degree of adaptability). In other words, the calculation equation is defined by using such a human visual sense characteristic that "objects originally different from each other in luminance may be felt as having the same brightness depending on the degree of adaptability".

Herein, the equation on which the calculation is based is proposed by Haubner, Bodmann, and others.

The equation is as follows:

$$L = 23Y^{0.31} - (5.62 Y_s^{0.31} + 1.65)$$

where

L represents a brightness sensation value,

Y represents a target luminance (cd/m$^2$), and

Ys represents an adaptation luminance (ambient luminance) (cd/m$^2$).

Figure 5:
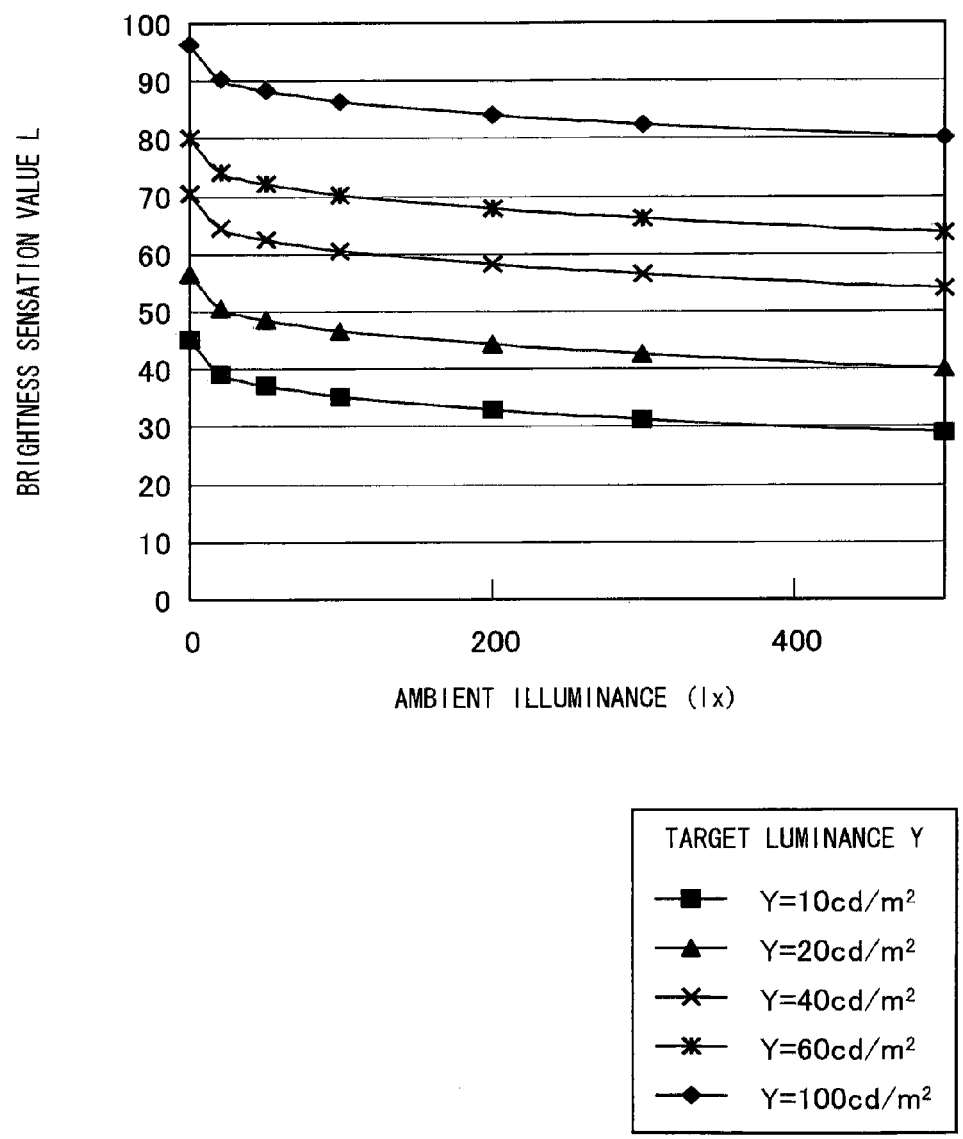
FIG. 5 is a graph illustrating a relationship between an ambient illuminance and a brightness sensation value.

FIG. 5 is a graph obtained by plotting values each indicative of a relationship between an ambient luminance and a brightness sensation value L in view of each of various target luminances Y.

As illustrated in FIG. 5, even though the target luminances Y are identical to each other, the brightness sensation value L felt by the human eye varies depending on the ambient luminance, and the brightness sensation value L is smaller as the ambient luminance is higher. That is, the target is felt darker as the ambient luminance is higher.

Figure 6:
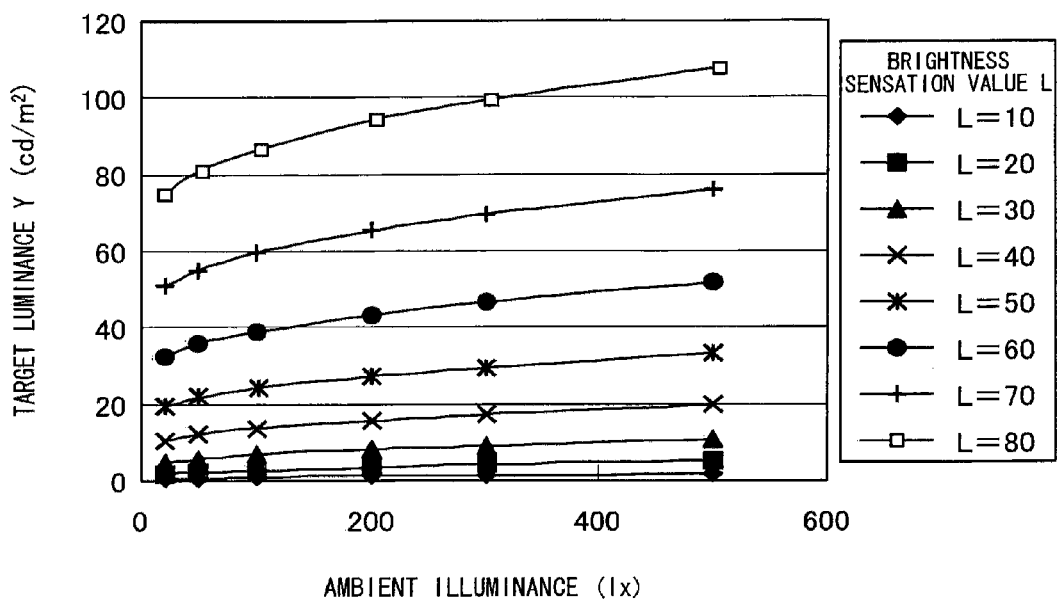
FIG. 6 is a graph obtained by plotting values each indicative of a relationship between an ambient illuminance and a target luminance in view of each of constant brightness sensation values.

Opposite to FIG. 5, FIG. 6 is a graph obtained by plotting target luminances Y so that the brightness sensation value L is constant with respect to variation of the ambient luminance, in view of each of various brightness sensation values L.

As illustrated in FIG. 6, when the ambient luminance is high, it is necessary to increase the target luminance Y in order to keep the brightness sensation value L. This shows that higher ambient luminance requires a higher light source output value for the light source 30.

Figure 7:
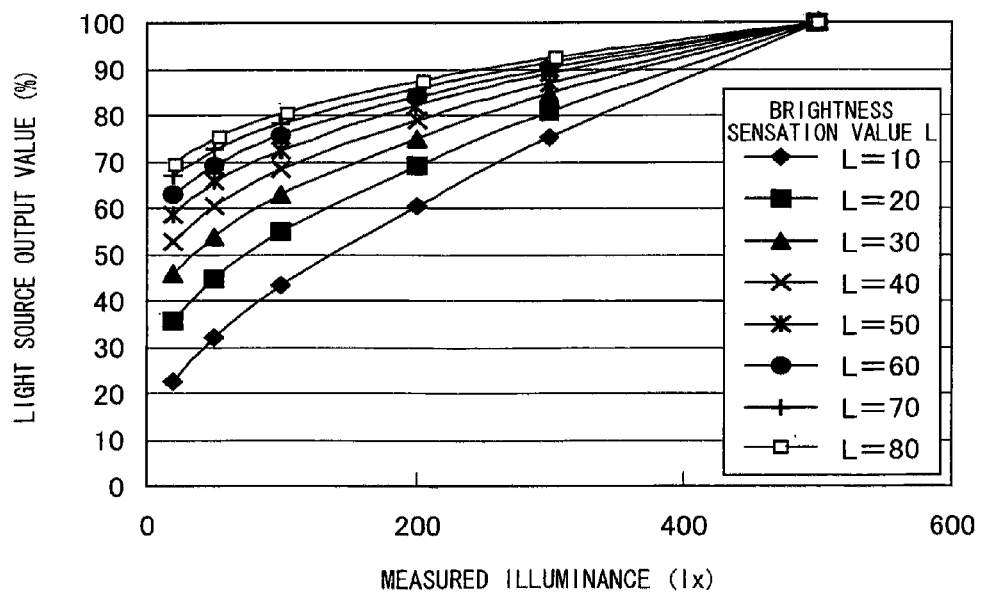
FIG. 7 is a graph illustrating a relationship between a measured illuminance and a light source output value.

Thus, a specific light source output value is determined in accordance with a relationship between the ambient luminance and the target luminance in FIG. 6. FIG. 7 is a graph in which the values plotted on FIG. 6 are standardized, in view of each of the respective brightness sensation values L, with the target luminance Y regarded as 100 when the ambient illuminance is 500 lx. Note that, in FIG. 7, the ambient illuminance is equal to an illuminance measured by the light receiving section 52 of the remote controller 50 (i.e., measured illuminance).

A vertical axis of FIG. 7 represents, in view of each of the brightness sensation values L, a light source output value (%) under such condition that a light source output value is 100% (maximum output of the light source) when the ambient illuminance is 500 lx (i.e., the light source output value is a value indicative of a ratio (%) of the output to a maximum output of the light source). FIG. 7 shows that, in case where the brightness sensation value L is 30 for example, the light source output value is set to 75% at 200 lx and to 63% at 100 lx for example so as to keep the brightness sensation value L constant regardless of the ambient illuminance.

Herein, a change rate of the light source output value with a change of the ambient illuminance varies depending on the brightness sensation value L. That is, in case of keeping the brightness sensation value L constant, the light source output at 200 lx for example is around 88% with respect to the light source output at 500 lx when the brightness sensation value L is 80. However, when the brightness sensation value L is 10, the light source output at 200 lx for example has to be around 60% with respect to the light source output at 500 lx.

Note that, an example of normal setting of the brightness sensation value is L=30. Further, the brightness sensation value may be intentionally set in accordance with a type of a video content item or user's preference.

(S6)

Further, the light source output control section 26 controls an output of the light source 30 in accordance with the light source output value having been calculated (S6 of FIG. 4).

Note that, it is preferable that the remote controller 50 includes a special operation button for starting measurement of brightness. Even if the display luminance is adjusted with measurement of brightness in controlling the display device main unit 10, e.g., in switching a channel, a video luminance of a broadcast program may subsequently vary greatly or ambient brightness of the display device main unit 10 may vary greatly, so that adjustment of the display luminance based on the initial brightness information may be inappropriate.

In this case, if the special operation button for starting measurement of brightness is provided, the user can easily start the measurement of brightness at any time as necessary. This makes it possible to adjust the display luminance so that the adjustment is more suitable for actual conditions.

Further, a method for adjusting the display luminance in accordance with brightness when a certain time period passes after the input operation is performed with the operation input section 51 may be as follows. The light receiving section 52 measures brightness when a certain time period passes after the input operation is performed with the operation input section 51, and the thus obtained brightness information is transmitted to the display device main unit 10. Another method thereof may be as follows. For example, the light receiving section 52 of the remote controller 50 sequentially measures brightness, and the thus obtained brightness information is sequentially transmitted to the display device main unit 10, and the signal receiving section 20 of the display device main unit 10 receives the brightness information when a predetermined time period passes.

Further, a method for automatically adjusting a display luminance of an image displayed on the display device main unit 10 is not limited to the method in which an output of the light source 30 is controlled but may be a method in which the display section 11 is controlled.

For example, the method may be such that a luminance of a displayed image is adjusted in case where the display section 11 is a self-luminous display element such as a CRT (Cathode Ray Tube) receiver.

Further, there is a method in which, for example, an optical transmittance of a liquid crystal display element is adjusted by adjusting a gray scale level so as to adjust a luminance of a displayed image even if the display section 11 is a non-self-luminous display element such as a liquid crystal display element.

The display luminance adjustment based on these methods is realized by causing the luminance control section 24 to control the display section 11 in accordance with the brightness in the direction of the display device main unit 10 which brightness has been measured by the light receiving section 52.

Embodiment 2

Figure 8:
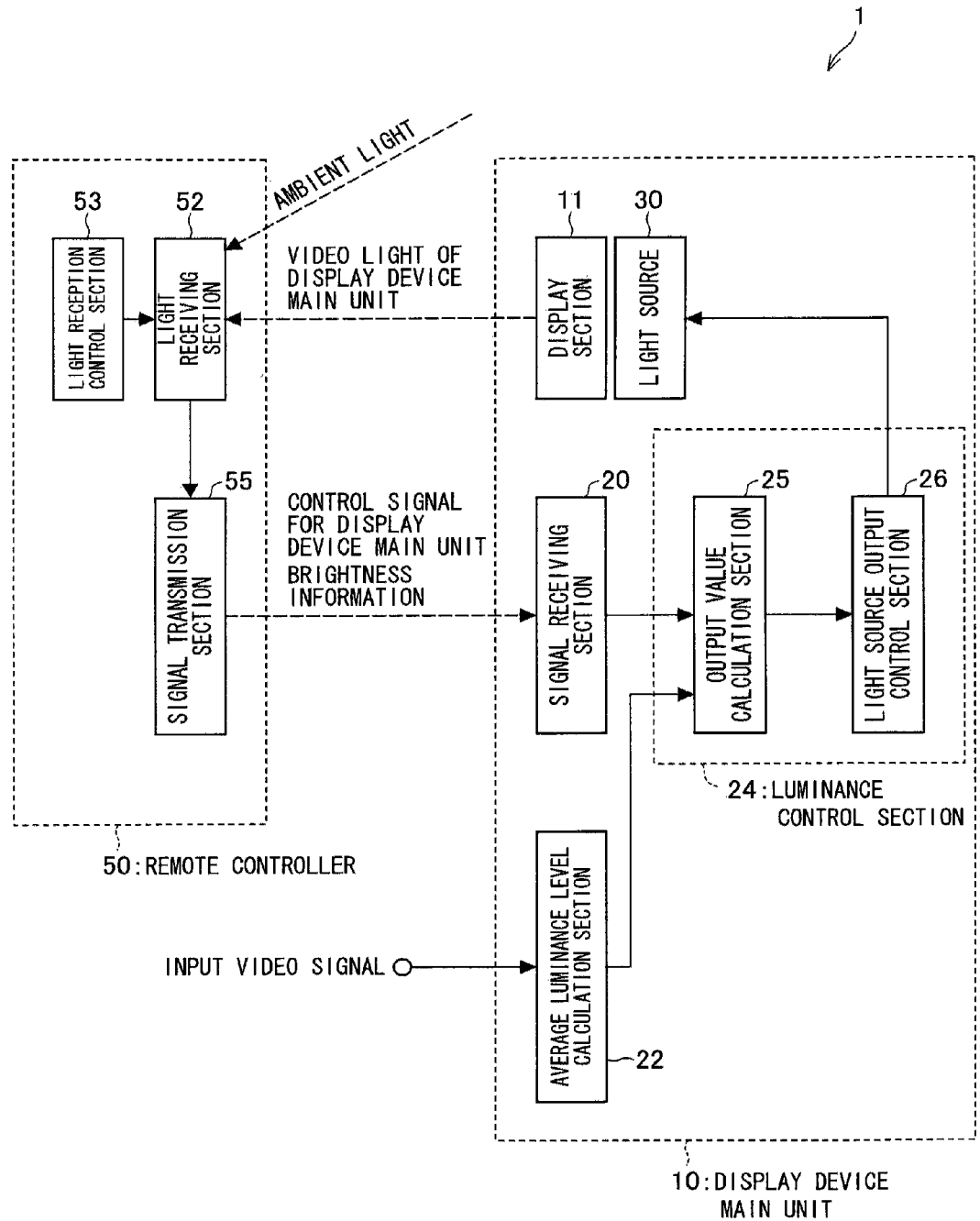
FIG. 8 is a block diagram illustrating another embodiment of an image display device of the present invention.
Figure 9:
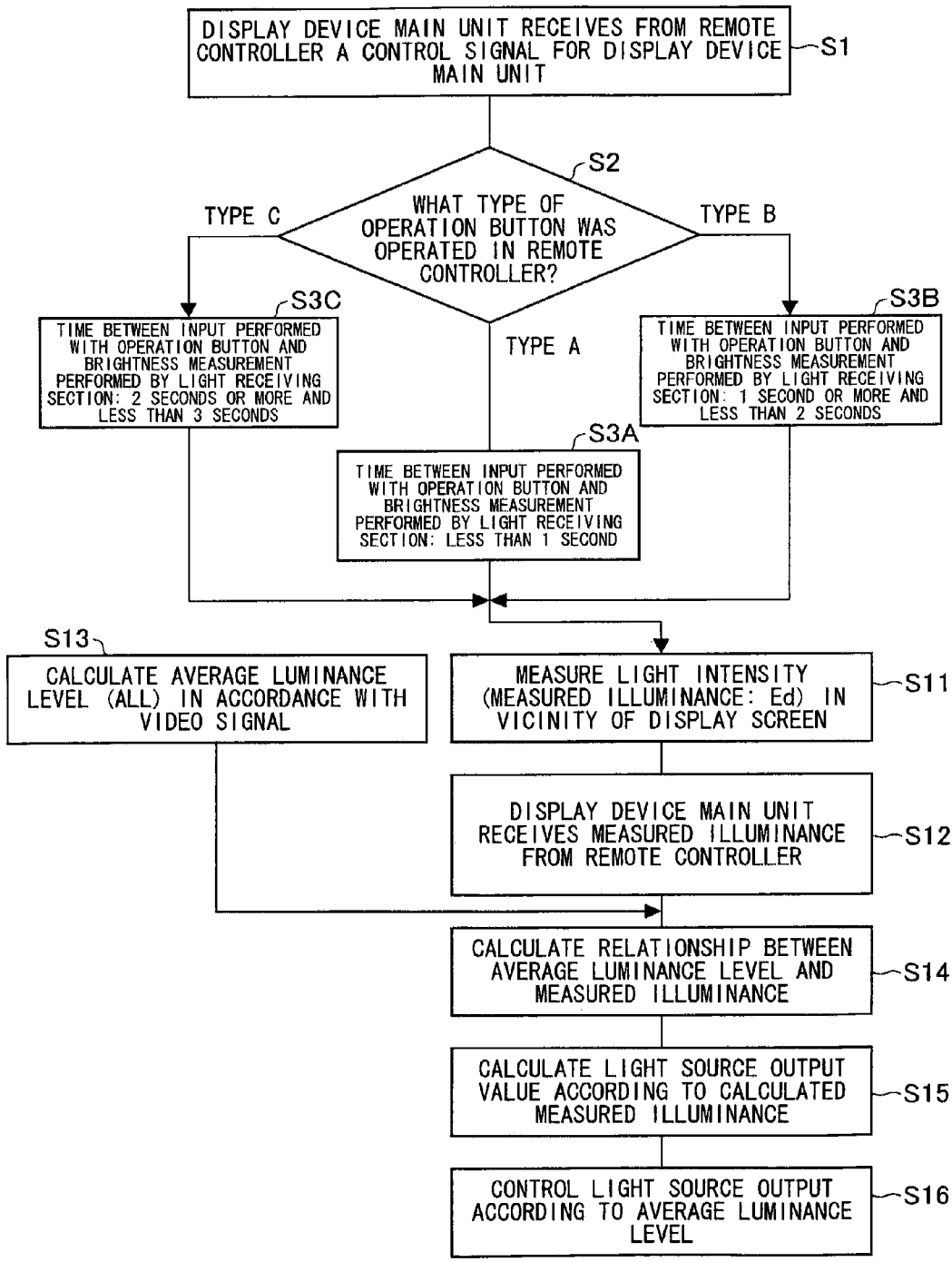
FIG. 9 is a flowchart illustrating a flow for adjusting a display luminance in another embodiment of the present invention.

With reference to FIG. 8, FIG. 9, and (a) and (b) of FIG. 10, another embodiment of the present invention is described as follows. Note that, the present embodiment is the same as Embodiment 1 except for the below-described configuration. Further, for convenience in description, the same reference numerals are given to members having the same functions as those of members illustrated in the drawings of Embodiment 1, and explanations thereof are omitted.

An image display device 1 of the present embodiment is characterized by performing real-time adjustment of a display luminance of an image displayed on the display section 11. The following description mainly explains differences from the image display device of Embodiment 1.
(Configuration of Image Display Device)

First, the configuration of the image display device 1 of the present embodiment is described as follows with reference to FIG. 8. FIG. 8 is a block diagram illustrating the configuration of the image display device 1 of Embodiment 2.

As illustrated in FIG. 8, the image display device 1 of the present embodiment is characterized in that there is provided an average luminance level calculation section 22 for calculating an average luminance level (ALL) of a video signal inputted to the display device main unit 10.

Further, the average luminance level calculation section 22 is connected to an output value calculation section 25 provided on the luminance control section 24. This allows the average luminance level calculated by the average luminance calculation section 22 to be transmitted to the output value calculation section 25.

Other parts of the image display device 1 of the present embodiment are configured substantially in the same manner as in those of the image display device 1 of Embodiment 1.
(Action)

Next, the following description explains how the image display device 1 of the present embodiment acts. The image display device 1 of the present embodiment is different from the image display device of Embodiment 1 in that there is performed real-time adjustment of a display luminance of an image displayed on the display section 11. The following description mainly explains differences from Embodiment 1.
(Adaptability Level and Measured Illuminance)

As in Embodiment 1, the image display device 1 of the present embodiment is configured so that: information on ambient brightness (measured illuminance=Ed) of the image display device main unit 10 which ambient brightness has been measured by the light receiving section 52 of the remote controller 50 is transmitted from the signal transmission section 55 via the signal receiving section 20 to the output value calculation section 25 of the luminance control section 24.

Human adaptability to brightness (optic adaptability level) varies depending on brightness entering the user's eyes. Thus, in case where a measured illuminance obtained by measuring brightness substantially equal to the brightness entering the user's eyes is measured in real time and a display luminance of an image displayed on the display section 11 is adjusted in accordance with a result of the real-time measurement, it is possible to finely adjust the display luminance in accordance with a change of the brightness entering the user's eyes. As a result, it is possible to make a display more suitable for the human adaptability to brightness.

However, for example, in the remote controller 50, it may be troublesome to frequently push the special operation button for giving an instruction to start the brightness measurement so as to measure the brightness entering the user' eyes.

In the present embodiment, the adaptability level is determined without directly measuring the measured illuminance. Specifically, the adaptability level is determined in accordance with the average luminance level of input video signal so as to control brightness of the light source. The following describes the specific adjustment method.
(Measured Illuminance and Video Light)

As illustrated in FIG. 1, brightness (substantially equal to the measured illuminance) entering the user's eyes in viewing the image display device, as its components, includes: brightness of light of image (brightness of image light) of the display device main unit; ambient brightness (ambient brightness of the image display device); and the like. Further, the brightness entering the user's eyes depends also on a viewing distance, i.e., a distance between the viewer and the display device main unit. This is because a size of a video which occupies a viewing angle changes when the viewing distance changes. For example, as the viewing distance is shorter, the brightness of image light has a greater influence.

However, a main component of the brightness entering the user's eyes is the brightness of image light, and it is often that brightness of illumination in the vicinity of the image display device main unit which influences ambient light is constant. Further, also the viewing distance hardly changes.

Thus, the brightness (substantially equal to the measured illuminance) entering the user's eyes can be estimated in accordance with brightness of video light.
(Measured Illuminance and Video Light/Average Luminance Level)

Further, the brightness of video light is determined mainly by an input video signal (image signal), and brightness of a video based on the input video signal can be represented by an average luminance level of the input video signal. Thus, it can be said that the measured illuminance can be estimated in accordance with the average luminance level of the input video signal. Specifically, it can be said that the measured illuminance and the average luminance level of the input video signal are in a linear relationship.

Figure 10:
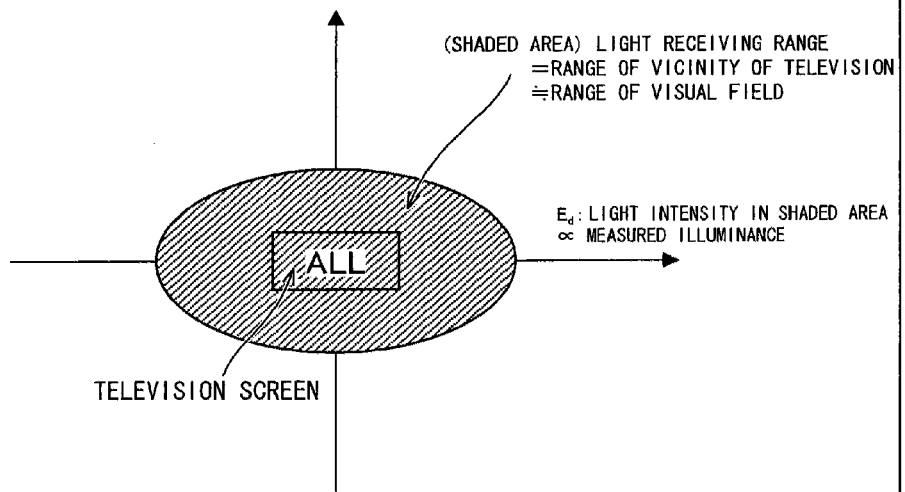
FIG. 10 illustrates a relationship between an average luminance level (ALL) and a measured illuminance. (a) of FIG. 10 illustrates a relationship between a television (TV) screen and a light receiving range. (b) of FIG. 10 illustrates a relationship between an average luminance level (ALL) and a measured illuminance (Ed) under various conditions.
Figure 10:
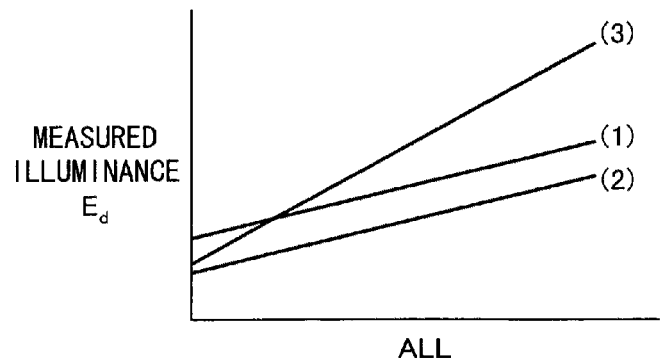
Figure 11:
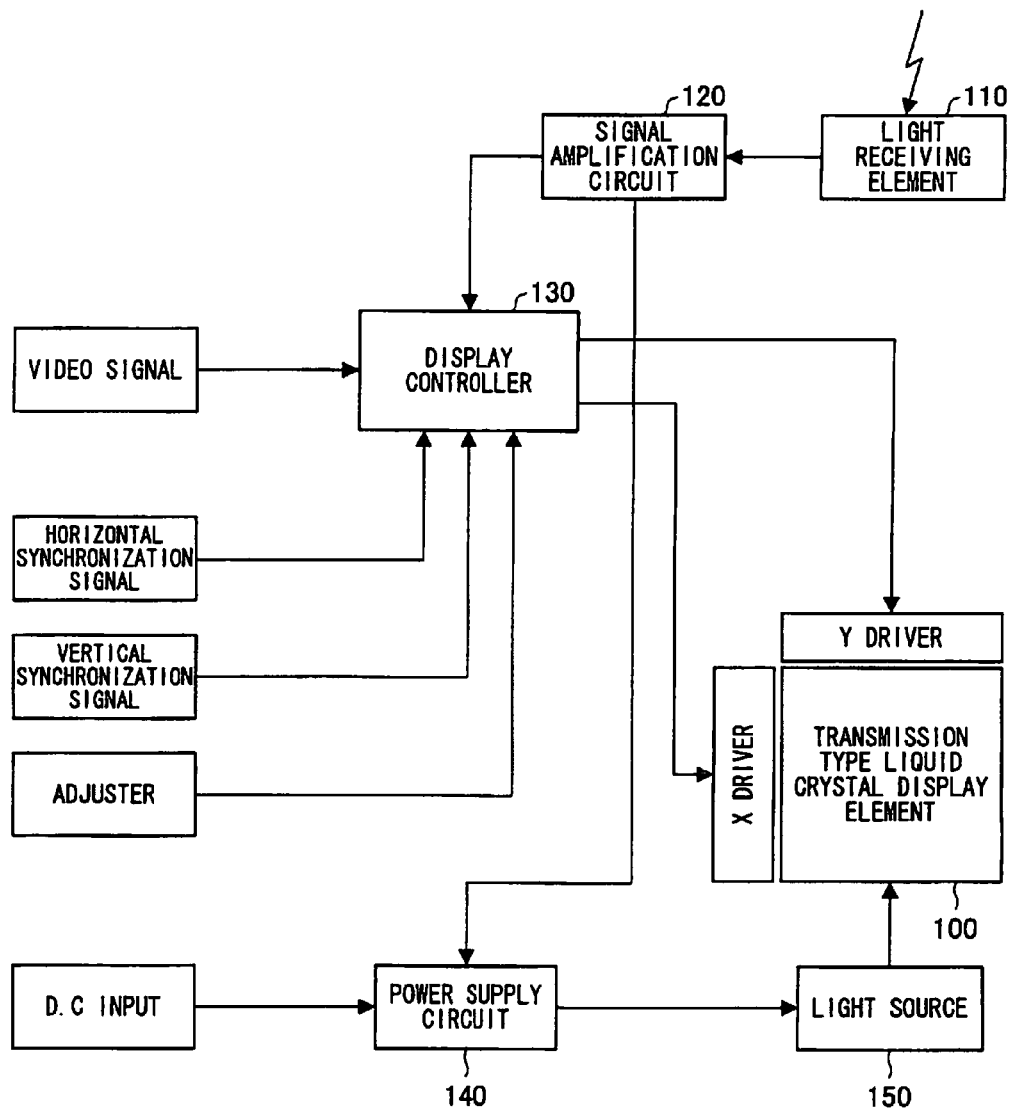
FIG. 11, showing a conventional art, is a diagram illustrating essential portions of an image display device.

(a) of FIG. 10 illustrates a relationship between a light receiving range of the measured illuminance and a television screen with a normal viewing distance. As illustrated in (a) of FIG. 10, with the normal viewing distance, the television screen occupies a certain part of the light receiving range for determining the measured illuminance. Further, in consideration for the aforementioned condition under which the ambient illuminance of the television is generally free from a great change when the user views the television, it is apparent that there is a linear relationship between the measured illuminance and the brightness of video light (this brightness is represented by the average luminance level of the input video signal).

(Adaptability Level, Measured Illuminance, and Average Luminance Level)

As described above, the adaptability level varies depending on the brightness entering the user's eyes, and the measured illuminance substantially equal to the brightness depends on the average luminance level of the input video signal.

Thus, it can be said that the adaptability level greatly depends on the average luminance level.

(Specific Luminance Adjustment)

In the present embodiment, with a focus on the aforementioned relationship (linear relationship between the measured illuminance and the brightness of video light), real-time adjustment can be performed with respect to the display luminance so as to be more suitable for the human adaptability to the brightness. The following describes an example where the image display device is a television.

(Expression Indicative of a Relationship Between the Measured Illuminance and the Average Luminance Level)

As described above, the ambient brightness (measured illuminance=Ed) of the display device main unit 10 which ambient brightness has been measured by the light receiving section 52 of the remote controller 50 and the average luminance level (ALL) of the input video signal are in the linear relationship.

That is, as indicated by a straight line (1) of (b) of FIG. 10, the relationship between the measured illuminance (Ed) and the average luminance level (ALL) can be expressed as follows.

$$Ed = a1 \cdot ALL + b1$$

Note that, (b) of FIG. 10 illustrates the relationship between the measured illuminance (Ed) and the average luminance level (ALL).

Herein, the measured illuminance can be obtained by the measurement performed with the light receiving section 52 of the remote controller 50, and the average luminance level of the input video signal can be obtained by calculation performed with the average luminance level calculation section 22 of the display device main unit 10.

However, constant numbers in the expression, i.e., "a1" and "b1", are pronumerals. Thus, in determining the constant numbers "a1" and "b1", it is necessary to obtain two or more data sets each containing (i) a measured illuminance and (ii) an average luminance level of the input video signal which average luminance level is obtained at the same time as the measurement of the measured illuminance.

As a method for obtaining the two or more data sets, various methods can be adopted, so that the method is not restrictive. As long as a measured illuminance and the like are obtained in association with an operation performed with the operation input section 51 of the remote controller 50, it is possible to adopt, for example, such a method that buttons serving as the operation input sections 51 are pushed twice or more times so as to store data sets into memory means or the like. Further, in turning ON a television, the user pushes buttons twice or more times in most cases, so that it is possible to obtain the two or more data sets without having any special care.

This makes it possible to determine "a1" and "b1" which have been pronumerals.

After "a1" and "b1" are determined, constant numbers "a" and "b" are calculated again in accordance with (a) a data set obtained in response to the last push of a button of the remote controller 50 and (b) a data set obtained in response to the previous push of a button of the remote controller 50, every time a button of the remote controller 50 is pushed. This allows the constant numbers "a" and "b" to be updated as necessary.

This makes it possible to keep "a" and "b" suitable for actual conditions.

For example, in case where ambient brightness changes, a relationship between a measured illuminance and an average luminance level accordingly changes. In case where the periphery is dark (in case where the illumination is dark), the relationship between Ed and ALL is expressed, as in a straight line (2) of FIG. 10, as follows.

$$Ed = a1 \cdot ALL + b2$$

That is, an inclination "a1" does not change and the "b1" changes into "b2". In this manner, the graph moves in a parallel manner.

Further, a change of the viewing distance varies a degree to which a change of the average luminance level influences a change of the measured illuminance, so that the relationship between the measured illuminance and the average luminance level can be expressed, as in a straight line (3) of (b) of FIG. 10, as follows.

$$Ed = a2 \cdot ALL + b3$$

That is, both "a1" and "b1" change, so that both the inclination and the intercept of the graph change.

(Light Source Output Control)

As described above, the image display device 1 of the present embodiment includes the average luminance level calculation section 22 for calculating an average luminance level of an input video signal. Thus, when the expression indicative of the relationship between the measured illuminance and the average luminance level of the input video signal is calculated, it is possible to calculate a measured illuminance for each input signal in real time in accordance with the average luminance level calculated by the average luminance level calculation section 22. Further, the light output is controlled in accordance with the calculated measured illuminance in the same manner as in Embodiment 1.

As described above, in the present embodiment, it is possible to obtain information on brightness of light of a video on the display device main unit 10 in real time by calculating the average luminance level. Further, this information is compared with brightness information (measured illuminance) in the vicinity of the screen which brightness information has been measured by the light receiving section 52 of the remote controller 50 so as to be analyzed. This makes it possible to calculate a degree to which the average luminance level has an influence on the measured illuminance (i.e., the relationship between the average luminance level and the measured illuminance).

Further, the average luminance level can be calculated in real time, so that a display luminance can be controlled in real time in accordance with a constantly changing video light intensity and a light intensity in the vicinity of the display screen. This makes it possible to make a display according to a current adaptability level.

(Flow for Adjusting Display Luminance)

With reference to FIG. 9, a flow for adjusting a display luminance is described as follows. FIG. 9 is a flowchart illustrating a flow for adjusting a display luminance in the present embodiment.

Step (S1) through Step (S3A, S3B, or S3C) are the same as in Embodiment 1 described with reference to FIG. 4, so that explanations thereof will be omitted. As to other steps, explanations of parts identical to those of Embodiment 1 will be omitted.

(S11)

At a predetermined time shown in the Step (S3A, S3B, or S3C), the light receiving section 52 of the remote controller 50 measures a light intensity (measured illuminance: Ed) in the vicinity of the display screen 16 (S11 of FIG. 9).

(S12)

Next, the measured illuminance is transmitted from the signal transmission section 55 of the remote controller 50, and the signal receiving section 20 of the display device main unit 10 receives information on the measured illuminance (S12 of FIG. 9).

(S13)

The average luminance level calculation section 22 calculates an average luminance level (All) of the input video signal (S13 of FIG. 9).

(S14)

The output value calculation section 25 calculates a relationship between the average luminance level and the measured illuminance (calculates an expression indicative of a relationship between the average luminance level and the measured illuminance) in accordance with the measured illuminance and the average luminance level which have been inputted (S14 of FIG. 9).

(S15)

Next, a measured illuminance (ambient illuminance) is calculated in accordance with the average luminance level of the input video signal which average luminance level has been calculated in real time by the average luminance level calculation section 22. Further, a light source output value is calculated by the output value calculation section 25 of the luminance control section 24 in accordance with the calculated measured illuminance (S15 of FIG. 9).

(S16)

Further, the light source output control section 26 controls an output of the light source 30 in accordance with the calculated light source output value (S16 of FIG. 9). In this manner, the light source is controlled according to the average luminance level.

As described above, the image display device 1 of the present embodiment includes: means for measuring brightness in the vicinity of the display section 11 of the image display device 1 (this brightness is equal to brightness of light received from a direction of the display device main unit); and means for calculating an average luminance level of a video displayed on the image display device 1. Further, there are obtained a plurality of combinations each containing (i) the brightness in the vicinity of the display section 11 and (ii) the average luminance level obtained at the same time. In accordance with the obtained combinations, an expression indicative of a relationship between the average luminance level of the video and the brightness in the vicinity of the display section 11 is derived.

Further, the average level calculation section 22 is provided, which allows real time calculation of the brightness in the vicinity of the display section 11 (this brightness depends on the average luminance level of the video) by the aforementioned expression on the basis of the average luminance level of the video, thereby automatically adjusting a display luminance of a video (image displayed on the display section 11) in accordance with the calculated value. As a result, it is possible to control a video display luminance suitable for a human visual property in real time.

Note that, it may be so configured that: there is additionally provided means for measuring in real time ambient brightness of the image display device which ambient brightness is other component entering the user's eyes in addition to the average luminance level, and a display luminance of an image displayed on the display section 11 is adjusted in real time in accordance with the thus measured information and the information on the average luminance level of the input video signal. Such a configuration makes it possible to adjust a display luminance so that the adjustment is more suitable for human adaptability to brightness than the case of adjusting an average luminance of an image in accordance with only the average luminance level of the input video signal.

Further, it may be so configured that the user can intentionally set a level of a display luminance relative to a relationship between brightness of light received from a direction of the display device main unit and an output value of the light source in accordance with a type of a video content item and the user's preference. In other words, it may be so configured that the brightness sensation value can be intentionally set.

As described above, the image display device of the present invention is configured so that the display device main unit includes a display section and a luminance control section for adjusting a display luminance of an image displayed on the display section, and the remote controller includes: a signal transmission section for transmitting a signal to the display device main unit; a light receiving section for measuring brightness of received light; and an operation input section for inputting an instruction regarding control for the display device main unit, and the light receiving section receives light from a direction of the display device main unit, and measures brightness of this light in association with the input operation performed with the operation input section, and the signal transmission section transmits, to the display device main unit, brightness information on the brightness of the light received from the direction of the display device main unit, said brightness being measured by the light receiving section, and the luminance control section of the display device main unit adjusts the display luminance of the display image on the display section, in accordance with the received brightness information.

As described above, the image display method of the present invention comprises: a first step in which a light receiving section provided on the remote controller measures brightness in a direction of the display device main unit; a second step in which the remote controller transmits brightness information on the brightness measured in the first step to the display device main unit and the display device main unit receives the brightness information; a third step in which an output value of a light source is calculated in accordance with the brightness information received in the second step; and a fourth step in which the display luminance of the display image displayed on a display section is adjusted in accordance with the output value of the light source which output value is calculated in the third step.

Therefore, it is possible to control the light source output in accordance with the information on the brightness in the direction of the display device main unit. This makes it possible to provide an image display device and an image display method each of which can adjust a display luminance to so that the adjustment is sufficiently suitable for human adaptability to brightness.

As described above, a display device of the present invention is configured so that: the display device main unit includes: a display section; a luminance control section for adjusting a display luminance of a display image displayed on the display section; and an average luminance level calculation section for calculating an average luminance level of an image signal inputted to the display section, and the remote controller includes: a signal transmission section for transmitting a signal to the display device main unit; a light receiving section for measuring brightness of received light; and an operation input section for inputting an instruction regarding control for the display device main unit, and the light receiving section receives light from a direction of the display device main unit, and measures brightness of this light in association with the input operation performed with the operation input section, and the signal transmission section transmits, to the display device main unit, brightness information on the brightness of the light received from the direction of the display device main unit, said brightness being measured by the light receiving section, and in accordance with (a) the brightness information received by the display device main unit and (b) the average luminance level of the image signal inputted to the display section at the same time as the brightness is measured, the luminance control section derives an expression indicative of a relationship between (i) an average luminance level of an image signal inputted to the display section when or after the brightness is measured and (ii) brightness of light received from a direction of the display device main unit at the same time as this image signal is inputted, and the luminance control section adjusts the display luminance of the display image on the display section, in accordance with calculated brightness of the light received from the direction of the display device main unit, said calculated brightness being calculated, on the basis of the expression, in accordance with the average luminance level of the image signal inputted to the display section when or after the brightness is measured.

As described above, the image display method of the present invention comprises: a first step in which a light receiving section provided on the remote controller measures brightness in a direction of the display device main unit; a second step in which an average luminance level calculation section provided on the display device main unit calculates an average luminance level of an image signal inputted to the display device main unit at the same time as the brightness is measured in the first step; a third step in which the remote controller transmits brightness information on the brightness measured in the first step to the display device main unit and the display device main unit receives the brightness information; a fourth step in which, in accordance with (a) the brightness information received by the display device main unit and (b) the average luminance level of the image signal inputted to the display section at the same time as the brightness is measured, a luminance control section provided on the display device main unit derives an expression indicative of a relationship between (i) an average luminance level of an image signal inputted to the display section when or after the brightness is measured and (ii) brightness of light received from a direction of the display device main unit at the same time as this image signal is inputted; and a fifth step in which the average luminance level calculation section adjusts, in real time, the display luminance of the display image on a display section, in accordance with calculated brightness of the light received from the direction of the display device main unit, said calculated brightness being calculated, on the basis of the expression, in accordance with the average luminance level of the image signal which average luminance level is calculated in real time, said image signal being inputted to the display section when or after the brightness is measured.

Therefore, it is possible to provide an image display device and an image display method each of which can adjust a display luminance so that the adjustment is more suitable for human adaptability to brightness, by adjusting the display luminance in accordance with a change of brightness entering the user's eyes.

The present invention is not limited to the description of the embodiments above, but may be altered by a skilled person within the scope of the claims. An embodiment based on a proper combination of technical means disclosed in different embodiments is encompassed in the technical scope of the present invention.

INDUSTRIAL APPLICABILITY

The present invention can adjust a display luminance, so that the present invention is applicable to an image display device, such as a liquid crystal display device and the like, which is provided with a fluorescent backlight or an EL backlight.

The invention claimed is:

1. An image display device, comprising:
a remote controller and a display device main unit, wherein
the display device main unit includes a display section and
    a luminance control section for adjusting a display luminance of a display image displayed on the display section, and
the remote controller includes,
    a signal transmission section for transmitting a signal to the display device main unit;
    a light receiving section for measuring brightness of received light; and
    an operation input section for inputting an instruction regarding control for the display device main unit, the light receiving section being configured to receive light from a direction of the display device main unit, and measure brightness of the received light in association with the input operation performed with the operation input section, and the signal transmission section is configured to transmit, to the display device main unit, brightness information on the brightness of the light received from the direction of the display device main unit, said brightness being measured by the light receiving section, and
    the luminance control section of the display device main unit is configured to adjust the display luminance of the display image on the display section, in accordance with the received brightness information, wherein
    the remote controller includes a light receiving control section for determining an input-to-measurement time between the input operation and a start of measurement of brightness which the measurement is performed by the light receiving section, and the light receiving control section is configured to determine the input-to-measurement time in accordance with a time between the input operation and response of the display device main unit which response is based on the instruction regarding the control for the display device main unit.

2. An image display device, comprising:
a remote controller and a display device main unit, wherein
the display device main unit includes,
    a display section,
    a luminance control section for adjusting a display luminance of a display image displayed on the display section, and
    an average luminance level calculation section for calculating an average luminance level of an image signal inputted to the display section; and the remote controller includes,
- a signal transmission section for transmitting a signal to the display device main unit;
- a light receiving section for measuring brightness of received light; and
- an operation input section for inputting an instruction regarding control for the display device main unit, the light receiving section is configured to receive light from a direction of the display device main unit, and measure brightness of the received light in association with the input operation performed with the operation input section, and the signal transmission section is configured to transmit, to the display device main unit, brightness information on the brightness of the light received from the direction of the display device main unit, said brightness being measured by the light receiving section, and in accordance with (a) the brightness information received by the display device main unit and (b) the average luminance level of the image signal inputted to the display section at the same time as the brightness is measured, the luminance control section is configured to derive an expression indicative of a relationship between (i) an average luminance level of an image signal inputted to the display section when or after the brightness is measured and (ii) brightness of light received from a direction of the display device main unit at the same time as this image signal is inputted, and the luminance control section is configured to adjust the display luminance of the display image on the display section, in accordance with calculated brightness of the light received from the direction of the display device main unit, said calculated brightness being calculated, on the basis of the expression, in accordance with the average luminance level of the image signal inputted to the display section when or after the brightness is measured.

3. The image display device as set forth in claim 2, wherein the luminance control section of the display device main unit is configured to derive the expression in accordance with a plurality of combinations each including (I) the information on the brightness which information is received by the display device main unit and (II) the average luminance level of the image signal inputted to the display section at the same time as the brightness is measured.

4. The image display device as set forth in claim 2, wherein the average luminance level calculation section is configured to calculate, in real time, the average luminance level of the inputted image signal, and the luminance control section of the display device main unit is configured to automatically adjust, in real time, the display luminance of the display image on the display section, in accordance with the calculated brightness of the light received from the direction of the display device main unit, said calculated brightness being calculated, on the basis of the expression, in accordance with the average luminance level of the image signal which average luminance level is calculated in real time.

5. The image display device as set forth in claim 2, wherein the display device main unit includes a light source for backlighting the display section, and the luminance control section includes a light source output control section for controlling an output of the light source, and the light source output control section is configured to adjust the display luminance of the display image on the display section by controlling the output of the light source in accordance with the calculated brightness of the light received from the direction of the display device main unit, said calculated brightness being calculated on the basis of the expression.

6. The image display device as set forth in claim 5, wherein the luminance control section includes an output value calculation section for calculating an output value of the light source, and the output value calculation section is configured to calculate the output value in accordance with the calculated brightness of the light received from the direction of the display device main unit, said calculated brightness being calculated on the basis of the expression, and the light source output control section controls the output of the light source in accordance with the calculated output value.

7. The image display device as set forth in claim 6, wherein the output value calculated by the output value calculation section is a value indicative of a ratio of the output to a maximum output of the light source.

8. The image display device as set forth in claim 6, wherein the output value calculation section is configured to calculate the output value of the light source, in accordance with a relationship between the brightness of the light and the output value of the light source by use of calculated brightness of the light received from the direction of the display device main unit, said relationship having been beforehand set so that the output value of the light source is larger as the brightness of the light received from the direction of the display device main unit is higher, said calculated brightness being calculated on the basis of the expression.

9. The image display device as set forth in claim 8, wherein the output value calculation section is provided so that a user is capable of setting a level of the display luminance relative to the relationship between the brightness of the light and the output value of the light source.

10. The image display device as set forth in claim 1, wherein
the signal transmission section and the light receiving section are provided on the remote controller so as to be positioned on a same surface of the remote controller.

11. The image display device as set forth in claim 1, wherein
a light receiving range of the light receiving section covers at least a range of an effective visual field of human eyes.

12. The image display device as set forth in claim 2, wherein:
the remote controller includes a light receiving control section for determining an input-to-measurement time between the input operation and a start of measurement of brightness which measurement is performed by the light receiving section, and the light receiving control section is configured to determine the input-to-measurement time in accordance with a time between the input operation and response of the display device main unit which response is based on the instruction regarding the control for the display device main unit.

13. The image display device as set forth in claim 1, wherein
the operation input section of the remote controller includes a special operation button for instructing the light receiving section to measure the brightness.

14. The image display device as set forth in claim 1, wherein:
the display section includes a display screen for displaying the display image thereon, and the display device main unit includes a signal receiving section, positioned in a center of an upper side of a frame surrounding the display screen, for receiving a signal transmitted from the remote controller.

15. An image display method, in which a display luminance of a display image displayed on a display device main unit of an image display device including a remote controller and the display device main unit is adjusted by controlling an output of a light source provided on the display device main unit, said method comprising:
measuring at a first time, by a light receiving section provided on the remote controller, brightness in a direction of the display device main unit, the first time based on one of a plurality of controls transmitted from the remote controller to the display device main unit, each of the plurality of controls being associated with an input-to-measurement time, the first time being the input-to-measurement time associated with the one control transmitted from the remote controller to the display device main unit;
transmitting, by the remote controller, brightness information on the brightness measured by the light receiving section to the display device main unit, the display device main unit receiving the brightness information;
calculating an output value of a light source in accordance with the brightness information received by the display device main unit; and
adjusting the display luminance of the display image displayed on a display section in accordance with the output value of the light source.

16. An image display method, in which a display luminance of a display image displayed on a display device main unit of an image display device including a remote controller and the display device main unit is adjusted by controlling an output of a light source provided on the display device main unit, said method comprising:
measuring, by a light receiving section provided on the remote controller, brightness in a direction of the display device main unit;
calculating, by an average luminance level calculation section provided on the display device main unit, an average luminance level of an image signal inputted to the display device main unit at the same time as the measuring the brightness;
transmitting, by the remote controller, brightness information on the brightness measured to the display device main unit, the display device main unit receiving the brightness information;
deriving, by a luminance control section on the display device main unit, in accordance with (a) the brightness information received by the display device main unit and (b) the average luminance level of the image signal inputted to the display section at the same time as the brightness is measured, an expression indicative of a relationship between (i) an average luminance level of an image signal inputted to the display section when or after the brightness is measured and (ii) brightness of light received from a direction of the display device main unit at the same time as the image signal is inputted; and
adjusting, by the average luminance level calculation section, in real time, the display luminance of the display image on a display section, in accordance with calculated brightness of the light received from the direction of the display device main unit, said calculated brightness being calculated, on the basis of the expression, in accordance with the average luminance level of the image signal which average luminance level is calculated in real time, said image signal being inputted to the display section when or after the brightness is measured.

17. The image display device as set forth in claim 2, wherein
the signal transmission section and the light receiving section are provided on the remote controller so as to be positioned on a same surface of the remote controller.

18. The image display device as set forth in claim 2, wherein
a light receiving range of the light receiving section covers at least a range of an effective visual field of human eyes.

19. The image display device as set forth in claim 2, wherein
the operation input section of the remote controller includes a special operation button for instructing the light receiving section to measure the brightness.

20. The image display device as set forth in claim 2, wherein:
the display section includes a display screen for displaying the display image thereon, and the display device main unit includes a signal receiving section, positioned in a center of an upper side of a frame surrounding the display screen, for receiving a signal transmitted from the remote controller.

* * * * *